Jan. 11, 1938.    E. G. CARROLL ET AL    2,104,735
BRAKE
Filed May 18, 1933    3 Sheets-Sheet 2

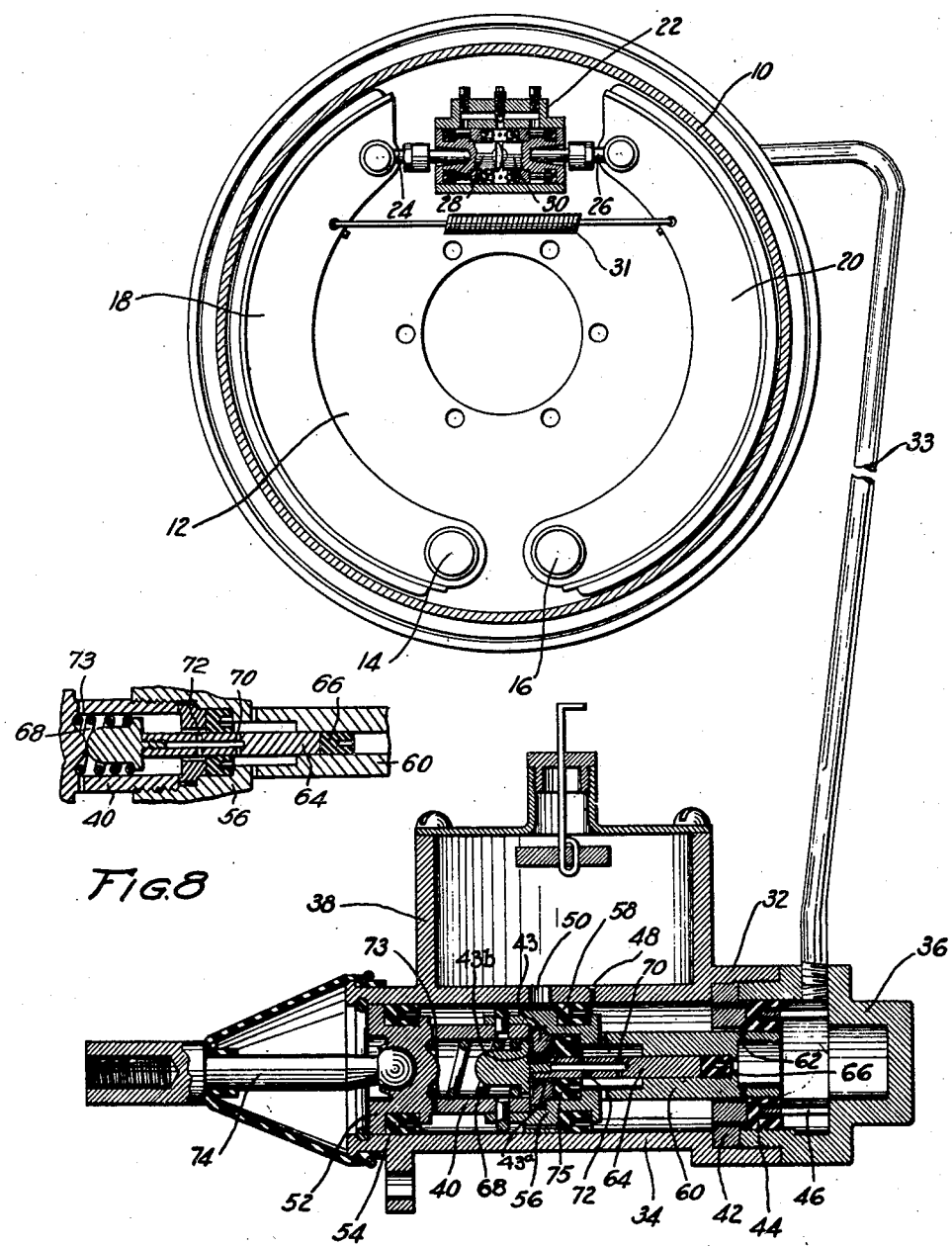

INVENTORS
EUGENE G. CARROLL
CECIL H. TAYLOR
BY
Jerome R. Cox
ATTORNEY

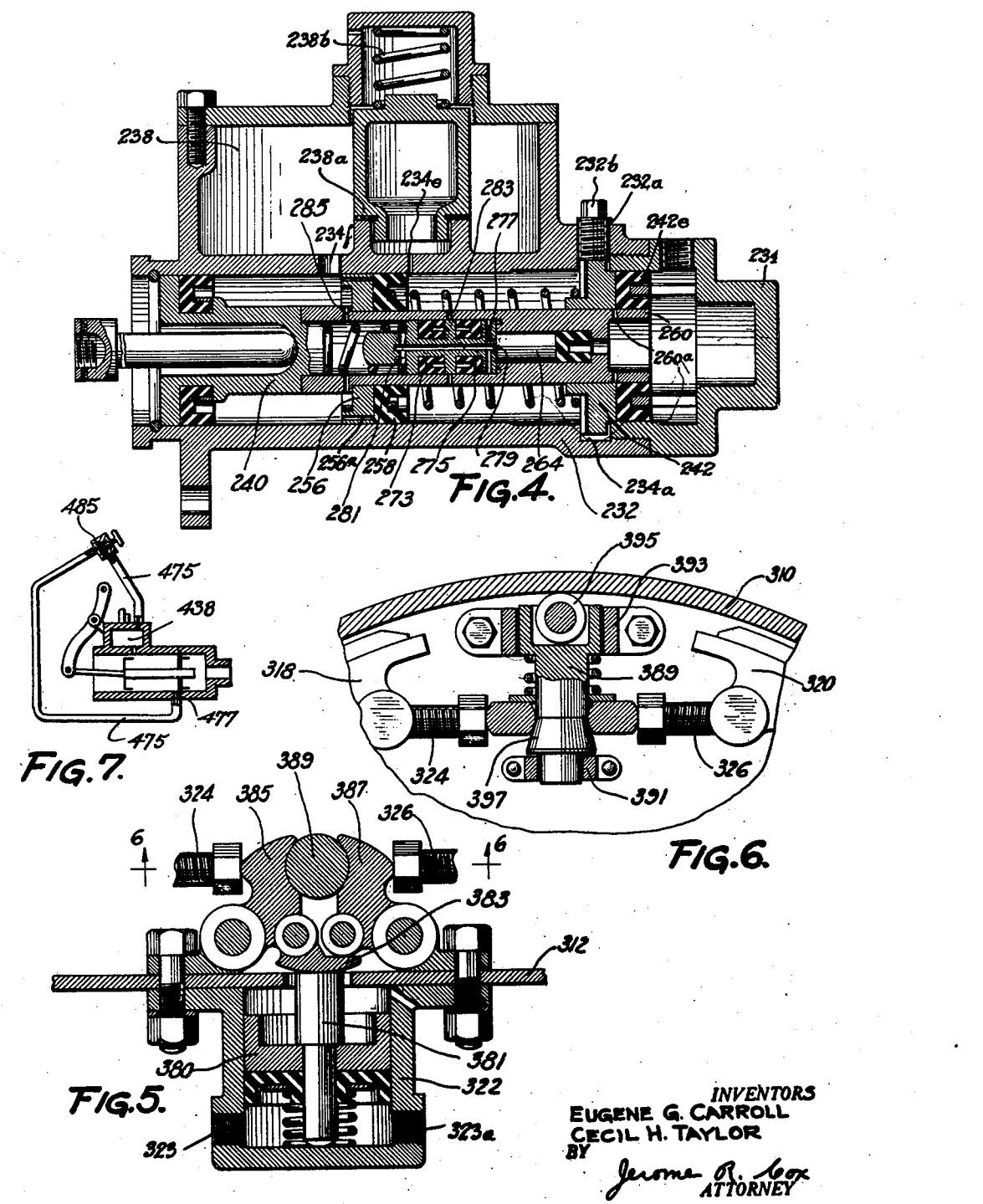

Patented Jan. 11, 1938

2,104,735

UNITED STATES PATENT OFFICE 2,104,735

BRAKE

Eugene G. Carroll and Cecil H. Taylor, South Bend, Ind., assignors to Bendix Aviation Corporation, South Bend, Ind., a corporation of Delaware Application May 18, 1932, Serial No. 612,136

16 Claims. (Cl. 60—54.6)

This application relates to braking systems and is disclosed as embodied in a hydraulic braking system.

In brake apparatus it is necessary to provide certain clearances between the friction elements in order to prevent dragging of the brakes. These clearances are increased in operation through wear of the parts. The maximum allowable travel of a brake pedal (such as usually is used in operating brakes) is limited by space in the vehicle and by the necessity of comfortable operation by the driver. Due to these factors the possible leverages have usually heretofore been limited to a degree sometimes considered undesirable.

It has been proposed to provide two phase systems in which part of the brake operating stroke is accomplished by a relatively large low pressure piston at relatively low leverages and part of the stroke is accomplished by a relatively small high pressure piston at relatively high leverages. Some of the prior art proposed designs include a spring operated valve through which liquid is by-passed from in front of a low pressure piston during the high pressure phase of the operation. Heretofore these valves have been controlled by the pressure of liquid which acts upon the low pressure piston and therefore the full force of the spring has reacted upon the pedal so that the results obtained have not been as advantageous as could be desired.

One of the objects of this invention is to provide a two phase system of hydraulic brakes in which a pressure relief valve is controlled by the pressure developed by the high pressure piston.

A further object of the invention is to provide improved means for lubricating the packing cups of a hydraulic brake system.

A feature of the invention is the location of a controlling valve within an operating piston.

A further feature of the invention is the provision of a recess in the wheel cylinder for supplying liquid to the outside of cups which are to be lubricated.

A further feature of the invention is an anchor provided with a cam surface and shiftable in response to drum expansion and contraction so that the released positions of the shoes correspond substantially to the condition of the drum with which they cooperate.

Further features and objects of the invention will be apparent from a reading of the subjoined specification and claims and after consideration of the accompanying drawings in which:

Figure 1 is a view of a hydraulic brake system, largely diagrammatic but showing the master cylinder and the wheel cylinder in section;

Figure 4 is a view in section of another modified form of master cylinder;

Figure 5 is a view in section showing a modified form of wheel cylinder;

Figure 6 is a view in section taken substantially on the line 6—6 of Figure 5;

Figure 7 is a view partly in section and partly diagrammatic illustrating a further modification;

Figure 8 is a fragmentary view showing the position of the large piston by-pass valve of Figure 1 in its operated position.

Figure 3:
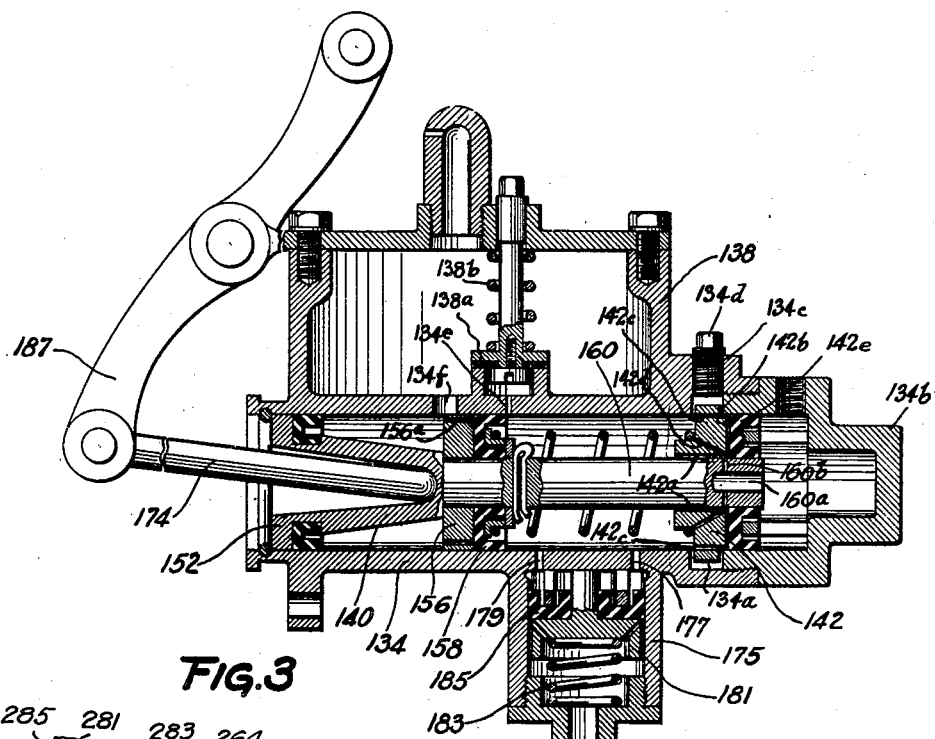
Figure 3 is a view in section showing a modified form of master cylinder.
Figure 9:
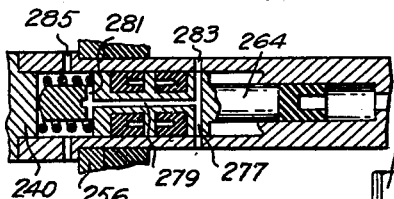
Figure 9 is a fragmentary view showing the large piston by-pass valve of Figure 4 in its operated position.

Referring in detail to Figure 1 we have shown a brake drum 10 provided with a backing plate 12 on which there are pivotally mounted as on anchors 14 and 16 a pair of brake shoes 18 and 20. Interposed between the free ends of the shoes is a wheel cylinder 22 adapted to move the shoes 18 and 20 into and out of contact with the drum 10 by means of links 24 and 26 pivotally connected to the shoes and bearing upon the pistons 28 and 30. A return spring 31 serves to release the shoes from contact with the drum when they are not forced into contact therewith by the wheel cylinder.

A master cylinder 32 supplies liquid under pressure to the wheel cylinder 22 by means of a conduit 33. The master cylinder 32 comprises a cylindrical casting 34, a cap 36 for the outer end thereof, a reservoir 38 formed integrally with the casting 34 and a plunger 40. The cylinder is provided with an annular head 42 with which there is associated an annular packing cup 44 maintained in the desired position by means of a slotted tube 46. The casting 34 is provided with a restricted inlet port 48 and a relatively large opening 50 both of which are at times adapted to allow the passage of liquid in either direction between the reservoir 38 and the cylinder 34.

The plunger 40 comprises a rearward piston 52 equipped with an annular packing cup 54 which serves to maintain a liquid seal behind a main piston 56 and which may therefore be termed a sealing piston. The piston 56 is provided with an annular cup 58 and normally is positioned just rearwardly of the port 48, so that it covers the opening 50. The piston 56 is adapted to force liquid to the brakes during the low pressure phase of operation but not during the high pressure phase of operation and therefore may be termed a low pressure piston. The plunger 40 is formed adjacent its forward end with an extension 60 of relatively small diameter. This extension passes through the central openings in the annular piston 42 and in the packing cup 44 and throughout both the high pressure and the low pressure phases of operation is adapted to force liquid to the wheel cylinders. It may be therefore termed the high pressure piston. It is provided with ports 62 by which liquid may pass the head 42 and the cup 44 while the system is at rest. Thus the entire system may be compensated for changes in the volume of the fluid due to rises and falls of temperature by means of the ports 48 and 62.

The plunger 40 is formed with a central passageway within which there is positioned a valve member 64. This valve member is provided at its forward end with a packing cup 66 on which the liquid pressure ahead of the piston 60 acts at all times. The valve member is normally maintained in its forward position by means of a spring 68. It is provided with spaced ports 70 and 72 and passes through a sealing cup 75. Thus in its normal position shown it prevents the passage of fluid from in front of the piston 56 to the rear thereof. However, when pressure ahead of the high pressure piston 60 is raised sufficiently to overcome the spring 68 and the valve member 64 is thus moved rearwardly, liquid may be bypassed from in front of the piston 56 through the ports 70 and the ports 72 and through ports 73 to the rear of the piston 56 whence it may communicate with the reservoir 38. It is to be understood that pressure on the front of the piston 64 moves it rearwardly so that while the ports 70 remain in front of the packing 75 the ports 72 are moved rearwardly of said packing and register with grooves 43a in head 43 and are connected by said grooves 43a with grooves 43b also formed in said head 43.

Figure 2:
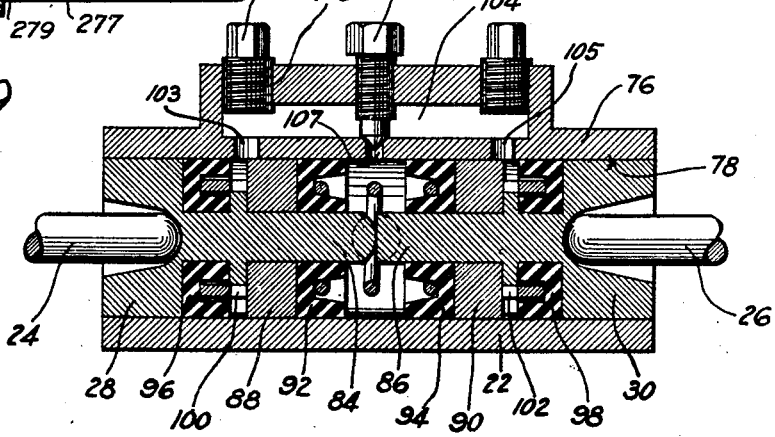
Figure 2 is a view in section and on an enlarged scale showing the wheel cylinder of Figure 1.

The structure of the wheel cylinder 22 is disclosed more clearly in Figure 2. The cylinder comprises a cylindrical casting 76 formed with a substantially uniform bore 78 in which there are positioned pistons 28 and 30. Each of these pistons has an inwardly extending projection such as the projections 84 and 86 which contact with each other to limit the inward movement of the pistons. Each is provided with an annular collar such as 88 and 90 and with operating annular cups such as the cups 92 and 94 which are positioned inward of the collars 88 and 90. Outward from the collars 88 and 90, the pistons are provided with sealing cups 96 and 98 which are spaced from the blocks 88 and 90 by means of slotted guide rings 100 and 102. Thus there is provided between the cup 96 and the collar 88 and between the cup 98 and the collar 90 a pair of recesses adapted to contain liquid to provide a liquid seal for the cups 92 and 94 and to insure the proper lubrication of the cups 92 and 94 which have to withstand the high pressures developed by the improved master cylinder disclosed. Communicating with the sealing recesses by means of ports 103 and 105 there is provided in the casting 76 a relatively large recess 104 which is adapted at times to communicate with the bore 78 but is normally sealed therefrom by means of a conical valve formed by a plug 106 having its inner end seated in a port 107. Tapped openings 108 are normally closed by plugs 109 but may be opened for bleeding the system.

In the operation of a braking system constructed according to the above description operation of the master cylinder through a pedal connected to the piston rod 74 moves the plunger 40 forward and through the piston 56 and the piston 60 forces a large quantity of fluid to the wheel cylinders, liquid being forced past the sealing cup 44 by the piston 56 by deflecting the cup 44. As soon as substantial resistance to movement of the wheel cylinders is encountered the pressure in the system increases thus forcing back the valve member and allowing the liquid just ahead of the piston 56 to by-pass back to the reservoir. Thereafter the brakes are operated through movement of the high pressure piston 60 at consequent smaller effort on the part of the operator.

The master cylinder shown in Figure 3 comprises a cylinder proper 134, a reservoir 138, a relief chamber 175 and a plunger 140. The plunger 140 includes a sealing piston 152, a low pressure piston 156, a high pressure piston 160, the latter being adapted to pass through an annular head 142. Intermediate the normal position of the piston 156 and the head 142, the cylinder is provided with a pair of ports 177 and 179 which communicate with the interior of the pressure relief chamber 175. Within the pressure relief chamber there is provided a plunger 181 normally maintained in its upper position by a spring 183 and provided with an annular sealing cup 185.

The head 142 has a projecting rim which fits loosely in a groove 134a formed between the front end of the cylinder 134 and the cap 134b screwed thereon. The cylinder 134 is provided with a bore 134c normally sealed by plug 134d, the plug being removed during the bleeding operation.

The head 142 is provided with grooves 142a, 142b, and 142c, and with port 142d which allow liquid to pass forward past said head at all times by deflecting the sealing cup 142e. The piston 160 is formed with a central bore 160a and with intersecting ports 160b adapted to register with grooves 142a and 142b and with port 142d. By means of said ports and grooves and bore, liquid may pass rearwardly of the head 142 when the parts are in the released position as shown.

The head 156 is provided with grooves 156a by means of which liquid may pass forwardly past said head at all times by deflecting the sealing cup 158.

The cylinder 134 is further provided with ports 134e and 134f which connect it with the reservoir 138. The port 134e is covered by a valve 138a resiliently held on its seat by a light spring 138b.

It may be seen that in the operation of the brake, the piston 156 and the head 142 form a pump for drawing liquid from the reservoir 138 through the port 134f and the bores 156a and past the sealing cup 158. Thence the liquid is forced past the head 142. When the parts are in the released position as shown, pressure of the wheel cylinder springs acting on the liquid in the system is effective to lift the spring 138b and allow the escape of excess liquid. However, the liquid in the system is kept under a slight pressure because of the spring 138b and the sucking in of air into the system is prevented.

In the operation of this form of master cylinder, the piston rod 174 is moved by means of a pedal through the lever 187 and forces the plunger 140 forward and thus forces fluid to the brakes by means of both the low pressure piston 156 and the high pressure piston 160. As soon as the port 179 is passed by the cup 158, liquid is able to by-pass from in front of the piston 156 to the rear thereof. Should the pressure ahead of the low pressure piston 156 become too great before the piston 156 has passed the bore 179 the spring 183 will compress and allow the fluid to pass into the pressure relief chamber 175 through either the port 177 or the port 179.

In Figure 7 we have shown a master cylinder arrangement similar to that shown in Figure 3. The master cylinder proper is provided with a port 477 which is connected by a conduit 475 provided with a valve 485 positioned conveniently for the operation by the driver. Beyond the valve 485 the conduit 475 leads back to the reservoir 438. As may be seen the valve 485 is normally held closed. In normal braking the pressure is developed by both pistons acting in combination. However, should it be desired to apply the brakes more firmly than usual, the pedal is depressed until substantial resistance is encountered, then the valve 485 is opened so as to relieve the pressures developed by the large piston and thereafter relatively high pressures are developed by the small piston alone.

The master cylinder 232 shown in Figure 4 is in most respects similar to the cylinder shown in Figure 1. However, the plunger 240 is simpler in design inasmuch as it comprises a rod having substantially a uniform diameter throughout and having the piston 256 slidably mounted thereon and held against rearward movement by means of a shoulder on the rod. Instead of a single cup through which the valve member passes for sealing it, the valve member 264 is provided with a pair of cups 273 and 275 which slide through the hollow plunger 240. The valve member is provided with intersecting bores 277, 279 and 281, the former of which is adapted at times to register with a port 283 in the plunger 240 and the latter of which is adapted at times to communicate with ports 285 in said plunger.

The annular head 242 like the head 142 is loosely fitted in a groove 234a formed between the cylinder 232 and the cap 234. The cylinder is provided with a threaded bore 232a normally closed by a plug 232b, the bore being provided so that the cylinder may be bled. The head 242 is provided with bores and grooves (not shown) leading to the rear of the sealing cup 242e and to the ports 260a formed in the forward end 260 of the plunger 240. Said ports in the head 242 correspond in design and function to the bores and grooves 142a, 142b, 142c, and 142d. Ports 234e and 234f connect the cylinder 232 with the reservoir 238. The port 234e is covered by a valve member 238a resiliently held on its seat by the spring 238b. The valve member 238a is hollow and is arranged to trap air therein so that the liquid in the system may be maintained under pneumatic pressure. The pressure is developed by a pumping action similar to that previously described in connection with Figure 3.

The piston 256 is provided with bores 256a so that liquid may at any time flow forward past the piston compressing the cup 258.

In the operation of this embodiment pressure on the pedal forces the plunger 240 forward carrying with it the piston 256. This forces a relatively large volume of liquid forward to the brakes, part being displaced by the forward end 260 of the plunger 240 and part being displaced by the piston 256, the latter portion being forced past the head 242 and the sealing cup 242e deflecting the latter. As soon as the pressure developed is strong enough the piston 264 is moved rearwardly relative to the plunger 240 aligning the port 277 with the port 283, thus allowing the liquid trapped between the piston 256 and the head 242 to escape through the ports 283, 277, 279, 285 and 234f. However, due to the fact that the port 283 in the normal position of the valves registers with a point on the valve member intermediate the sealing cups 273 and 275 there is less possibility of leakage.

In Figures 5 and 6 we have shown a brake drum 310 having a backing plate 312 and adapted to cooperate with brake shoes 318 and 320. The shoes 318 and 320 instead of being anchored on the backing plate, are secured to each other at their opposite ends. The shoes 318 and 320 have secured thereto links 324 and 326 by means of which the shoes are operated and through which the shoes anchor. The shoes are floating and both anchor in one direction of drum rotation through one link and in the other direction of drum rotation through the other link. Secured to the backing plate 312 is a wheel cylinder 322 provided with a piston 380 associated with a piston rod 381. The outer end of the piston rod 381 passes through the backing plate 312 and contacts with a small lever 383 pivoted upon a larger lever 385 which is itself pivoted upon a clamp secured to the backing plate. A lever 387 similar to the lever 385 but reversed thereto is pivoted upon a similar clamp secured to the backing plate 312 and is adapted to be operated by the lever 383. The levers 385 and 387 anchor upon a slidable pin 389. They are adapted to be operated by the piston 380 through the piston rod 381 and are adapted to move the shoes into contact with the drum. The pin 389 is slidably mounted in bearings 391 and 393 and is provided adjacent its outer end with a roller 395 which contacts with the rim of the drum. A spring 397 maintains the roller 395 in contact with the drum and thus the position of the pin is determined by the drum and the pin therefore moves with the expansion and contraction of the drum. The inner end of the pin is formed with a conical surface 397 upon which the levers 385 and 387 are adapted to anchor.

The cylinder 322 is provided with bores 323 and 323a to which are connected conduits (not shown) similar to the conduit 33 of Figure 1. Liquid may be forced by a master cylinder through said conduits into the cylinder 322 to displace the piston 380 to apply the brake.

In the operation of this wheel cylinder liquid supplied to the cylinder forces the piston rod 381 outward and thus tends to rotate the levers 385 and 387 equally. Due to the wiping action when the brake is applied, the torque of the brake application reacts through one of the levers in one direction of drum rotation and through the other lever in the other direction of drum rotation. It thus reacts through one or the other of the levers on the pin 389 and through the pin on the bearings 391 and 393. When the parts return to their normal position the pin 389 moves inward or outward depending on the expansion and contraction of the drum and thus the released positions of the shoes are controlled by the expansion and contraction of the drum.

Due to the inherent compensation of the hydraulic system, the piston 380 follows up the movement of the pin 389 but the master cylinder piston always returns to its normal position so that regardless of the expansion of contraction of the drum, the pedal travel remains uniform.

It is to be understood that the above described embodiments of the invention are for the purpose of illustration only and various changes may be made therein without departing from the spirit and scope of the invention.

We claim:

1. In a hydraulic brake system, a cylinder; an annular piston slidable therein; a concentric piston of smaller diameter extending forward from said annular piston and formed with a longitudinal bore extending to the front end thereof and with a port communicating with said bore; a valve member slidably mounted in said bore and extending rearwardly through said annular piston, said valve member being formed with a longitudinal bore extending through a part of its length and with a pair of intersecting bores, one adapted to register with said port and the other adapted to communicate at times with the portion of said cylinder rearwardly of said annular piston; a spring acting on said valve and normally maintaining said intersecting bores out of communication with said rearward chamber; an annular head through which the front end of said small area piston slides, and a packing cup associated with the front end of said valve member whereby fluid pressure in advance of said head acts on said valve to move it to open communication between the portion of the cylinder just in advance of said annular piston and the portion rearwardly thereof.

2. In a hydraulic brake system, a cylinder, a piston in said cylinder having a recess formed therein and having transverse ports, a slidable valve element in said recess formed with a longitudinal bore and a plurality of intersecting transverse bores adapted at times to register with said transverse ports, and a pair of reversed cups positioned between said transverse bores.

3. In a fluid system for operating brakes, a master cylinder, a piston having a relatively large diameter associated therewith, a piston having a relatively small diameter connected with the large diameter piston and comprising a forward extension thereof and having a recess formed therein at its forward end, means for conducting fluid acted on by both of said pistons to said brakes, and a slidable valve element in said recess effective at times to by-pass liquid from the front to the rear of said large diameter piston and controlled by the pressure ahead of said small diameter piston.

4. In a fluid system for operating brakes, a master cylinder, a piston having a relatively large diameter associated therewith, a piston having a relatively small diameter connected with the large diameter piston and comprising a forward extension thereof and having a recess formed therein at its forward end, means for conducting fluid acted on by both of said pistons to said brakes, a slidable valve element in said recess effective at times to by-pass liquid from the front to the rear of said large diameter piston and controlled by the pressure ahead of said small diameter piston, and means comprising an annular head through which the small diameter piston passes for preventing fluid pressure developed by the small diameter piston from reacting on said large diameter piston.

5. In a fluid system for operating brakes; a master cylinder; a piston having a relatively large diameter associated therewith, a pair of relatively movable piston elements associated with said large diameter piston one of which is formed as a sleeve having a diameter smaller than that of the large diameter piston and the other piston element being cylindrical, fitting within the sleeve element, being formed with a longitudinal bore and a plurality of intersecting transverse bores, and serving together with said sleeve element to form a valve for by-passing liquid from in front of said large diameter piston to the rear of said large diameter piston and one of the piston elements being connected with the large diameter piston and comprising a forward extension thereof, and the element not connected to said large diameter piston being controlled in its relative movement by the pressure of the liquid ahead of said piston element; and means for conducting fluid acted on by both of said pistons to said brakes.

6. In a fluid system for operating brakes, a master cylinder, a piston having a relatively large diameter associated therewith, a pair of relatively movable piston elements associated with said large diameter piston one of which is formed as a sleeve having a diameter smaller than that of the large diameter piston and the other piston element being cylindrical, fitting within the sleeve element, being formed with a longitudinal bore and a plurality of intersecting transverse bores and serving together with said sleeve element to form a valve for by-passing liquid from in front of said large diameter piston to the rear of said large diameter piston and one of the piston elements being connected with the large diameter piston and comprising a forward extension thereof, and the element not connected to said large diameter piston being controlled by the pressure of the liquid ahead of said piston element; means for conducting fluid acted on by both of said pistons to said brakes; and means comprising an annular head through which the small diameter piston passes for preventing fluid pressure developed by said small diameter piston from reacting on said large diameter piston.

7. In a hydraulic brake system, a cylinder, a piston in said cylinder having a recess formed therein and having transverse ports connected to said recess, a slidable valve element in said recess formed with a longitudinal bore and a plurality of longitudinally spaced intersecting transverse bores adapted at times to cooperate with said transverse ports to allow the escape of liquid from in front of said piston to the rear of said piston, and a sealing cup at times positioned between said transverse bores.

8. In a hydraulic brake system, a cylinder, a piston in said cylinder having a recess formed therein and having a transverse port, a slidable valve element in said recess formed with a longitudinal bore and with an intersecting transverse bore adapted at times to cooperate with said transverse port to conduct liquid from said transverse port, and a sealing cup arranged to prevent the passage of liquid through said recess except by way of said transverse port and said transverse longitudinal bore.

9. In a hydraulic brake system, a cylinder, a piston in said cylinder having a relatively large diameter, a relatively small diameter piston in said cylinder having a recess formed therein and having a transverse port, and a slidable valve element in said recess formed with a longitudinal bore and with a plurality of intersecting transverse bores one of which is adapted at times to cooperate with said transverse port to conduct liquid from ahead of said large diameter piston to said longitudinal bore and the other of which is adapted to conduct liquid from said longitudinal bore to the rear of said large diameter piston.

10. In a hydraulic brake system, a cylinder, a piston in said cylinder having a relatively large diameter, a relatively small diameter piston in said cylinder having a recess formed therein and having a transverse port, a slidable valve element in said recess formed with a longitudinal bore and with a plurality of intersecting transverse bores one of which is adapted at times to cooperate with said transverse port to conduct liquid from ahead of said large diameter piston to said longitudinal bore and the other of which is adapted to conduct liquid from said longitudinal bore to the rear of said large diameter piston, and means for controlling the position of said slidable valve element depending on the pressure of the liquid ahead of said small diameter piston.

11. In a hydraulic brake system, a cylinder, a piston in said cylinder having a relatively large diameter, a relatively small diameter piston in said cylinder having a recess formed therein and having a transverse port, a slidable valve element in said recess formed with a longitudinal bore and with a plurality of intersecting transverse bores one of which is adapted at times to cooperate with said transverse port to conduct liquid from ahead of said large diameter piston to said longitudinal bore and the other of which is adapted to conduct liquid from said longitudinal bore to the rear of said large diameter piston, and a sealing cup associated with said small diameter piston and said slidable valve element to prevent the passage of liquid rearwardly between said piston and said valve element except by way of said longitudinal bore.

12. In a fluid system for operating brakes, a master cylinder, a piston having a relatively large diameter associated therewith, a piston having a relatively small diameter connected with the large diameter piston and comprising a forward extension thereof and formed with a recess and with a transverse port, a pressure piston positioned in said recess formed with a longitudinal bore and with a pair of intersecting transverse bores, and means for controlling the position of said pressure piston depending upon the pressure of the liquid ahead of said smaller piston.

13. In a fluid system for operating brakes, a master cylinder, a piston having a relatively large diameter associated therewith, a piston having a relatively small diameter connected with the large diameter piston, comprising a forward extension thereof and formed with a recess and with a transverse port, a pressure piston positioned in said recess formed with a longitudinal bore and with a pair of intersecting transverse bores, means for controlling the position of said pressure piston to control the escape of liquid from in front of said large diameter piston to the rear thereof depending upon the pressure of the liquid ahead of said smaller piston, and means to limit the movement of said pressure piston.

14. In a fluid system for operating brakes, a master cylinder, a piston having a relatively large diameter associated therewith, a piston having a relatively small diameter connected with the large diameter piston and comprising a forward extension thereof and having a recess formed therein at the forward end, means for conducting fluid acted on by both of said pistons to said brakes, a slidable valve element in said recess effective at times to by-pass liquid from the front to the rear of said large diameter piston and controlled by the pressure ahead of said small diameter piston, and means comprising an annular head through which the small diameter piston passes for preventing the escape of fluid from in front of the small diameter piston to the rear thereof.

15. In a fluid system for operating brakes, a master cylinder, a piston having a relatively large diameter associated therewith, a pair of relatively movable piston elements associated with said large diameter piston one of which is formed as a sleeve having a diameter smaller than that of the large diameter piston and the other piston element being cylindrical, fitting within the sleeve element, being formed with a longitudinal bore and a plurality of intersecting transverse bores and serving together with said sleeve element to form a valve for by-passing liquid at times from in front of said large diameter piston to the rear of said large diameter piston and one of the piston elements being connected with the large diameter piston and comprising a forward extension thereof, and the element not connected to said large diameter piston being controlled by the pressure of the liquid ahead of said piston element; means for conducting fluid acted on by both of said pistons to said brakes; and means comprising an annular head through which the small diameter piston passes for preventing the escape of fluid from in front of the small diameter piston to the rear thereof.

16. In a hydraulic brake system, a cylinder, a piston in said cylinder having a relatively large diameter, a relatively small diameter piston in said cylinder having a recess formed therein and having a transverse port, a slidable valve element in said recess formed with a longitudinal bore and with a plurality of intersecting transverse bores one of which is adapted at times to cooperate with said transverse port to conduct liquid from ahead of said large diameter piston to said longitudinal bore and the other of which is adapted to conduct liquid from said longitudinal bore to the rear of said large diameter piston, and means to control the relative position of said valve element to allow or prevent the conduction of liquid.

EUGENE G. CARROLL.
CECIL H. TAYLOR.